United States Patent

[11] 3,614,436

[72] Inventors Seiro Hasegawa
Ikeda-shi;
Hiroshi Matsushima, Kadoma-shi, both of
Japan
[21] Appl. No. 785,919
[22] Filed Dec. 23, 1968
[45] Patented Oct. 19, 1971
[73] Assignee Matsushita Electric Industrial Co., Ltd.
Kadoma-shi, Japan
[32] Priority Dec. 28, 1967, Mar. 22, 1968
[33] Japan
[31] 42/71 and 43/19280

[54] THERMOLUMINESCENCE DOSIMETER DEVICE
9 Claims, 11 Drawing Figs.

[52] U.S. Cl. .......... 250/71.5, 250/83.3
[51] Int. Cl. .......... G01t 1/11
[50] Field of Search .......... 250/83.3, 83.6, 71.5

[56] References Cited

UNITED STATES PATENTS

| | | | |
|---|---|---|---|
| 3,101,409 | 8/1963 | Fite | 250/83.3 X |
| 3,288,997 | 11/1966 | McCall | 250/83.3 X |
| 3,398,279 | 8/1968 | Gates, Jr. | 250/83.6 X |
| 3,419,880 | 12/1968 | Takano et al. | 250/83.6 X |

*Primary Examiner*—Archie R. Borchelt
*Attorney*—Stevens, Davis, Miller & Mosher

ABSTRACT: A digital electrometer having an electrometer amplifier and a digital voltmeter for giving a digital display of a very low voltage. In the device, an analog to digital converter converts the output from the electrometer amplifier into a digital quantity and the digital output from the analog to digital converter is counted by a counter for the digital display of the voltage.

THERMOLUMINESCENCE DOSIMETER DEVICE

Figure 1A:
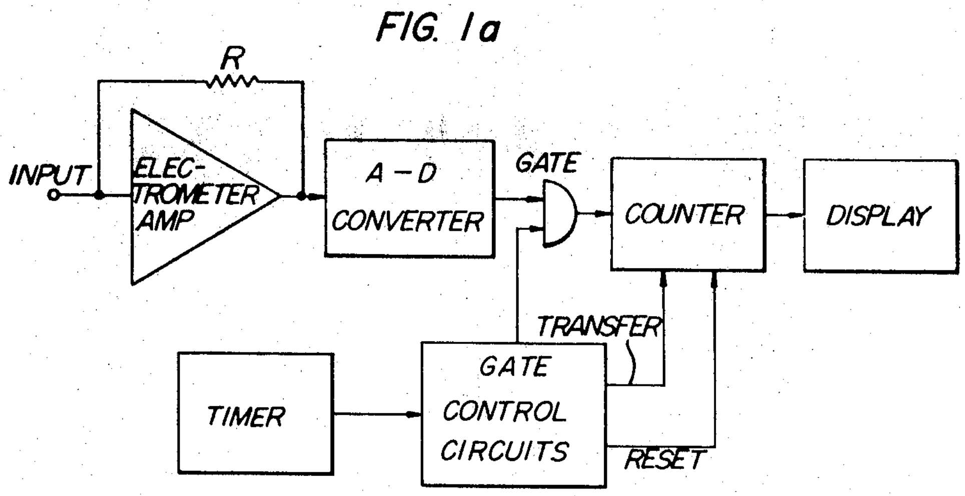

This invention relates to digital electrometers and more particularly to a digital electrometer suitable for use as a thermoluminescence reader.

Conventional electrometers are invariably adapted to display the measured value on an indicating instrument in an analog fashion. Thus, the indication can not be preserved unless the input is continuously connected with the electrometer, and the indication returns to zero as soon as the input is cut off. When, however, the electrometer is used as a current integrator for the measurement of charge, the indication can be preserved since the charge stored in a capacitor can be preserved in its existing state even when the input is cut off. As a matter of practice, the charge so stored can not completely be preserved because there is leakage of the charge from the capacitor, and interposition of a switch in the input circuit is undesirable because it also provides a cause for leakage. Such a problem can be overcome by employing an electrometer adapted to give digital indication. In the digital electrometer, the measured value can digitally be preserved at any desired time by applying a holding signal thereto. The measured value can safely be preserved even when the input thereto is cut off. A level detector may be disposed in the next stage of an electrometer amplifier to produce a range switchover signal for the automatic switchover of ranges. In this case, it is difficult to accurately determine the level. The digital electrometer is preferred in this respect too since an overflow signal from a counter can be utilized for the desired switchover of the range.

It is an object of the present invention to provide a digital electrometer which can automatically or manually preserve and display the measured value of voltage, current or charge appearing at a certain time after the measurement is started. Thus, the digital electrometer can digitally preserve the measured value even when the input disappears and can very conveniently be used for the measurement of a phenomenon which may appear only once. When the digital electrometer is used as a current integrator, its integrated output shows a steady increase and does not decrease if the polarity of input current is constant and invariable. Therefore, for the switchover of the range of the integrator, the capacity of an associated capacitor may merely be increased. Since, in such a case, the charge stored in the capacitor is divided, the capacitor itself is not replaced by another capacitor but one capacitor after another must be additionally connected therewith.

Another object of the present invention is to provide a digital electrometer in which an overflow from a counter is utilized to generate a range switchover signal so that the range can automatically be switched over for an unexpected input, thereby eliminating the possibility of failure to measure an input resulting from occurrence of a singular phenomenon. It is commonly known that materials of some kind irradiated with radiation such as X-rays or $\gamma$-rays emit fluorescence when they are heated up to a certain temperature. It is the thermoluminescent dosimeter which utilizes this phenomenon for the measurement of radiation. The thermoluminescence produced as a result of heating of the material is converted into current by a photomultiplier and the current is integrated thereby determine the dose of the radiation directed to the material. Therefore, a thermoluminescence reader may be constituted from the combination of a digital current integrator having the function of automatic preservation of the measured value and automatic switchover of the range as described in the first and second objects, a photomultiplier connected to the input of the digital current integrator, and a heating means. Thermoluminescence disappears when the material is heated once and there is no chance for another measurement thereof.

It is a further object of the present invention to provide a thermoluminescence reader adapted for use in combination with a thermoluminescent dosimeter so as to unfailingly measure a dose of radiation which can not be measured repeatedly.

Figure 1B:
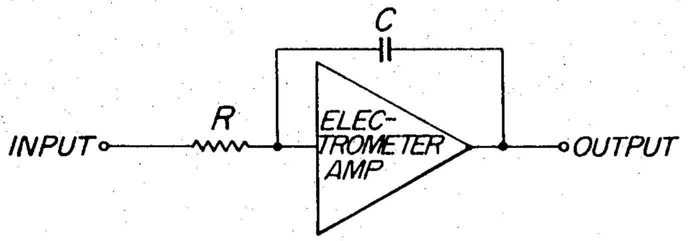
Figure 1C:
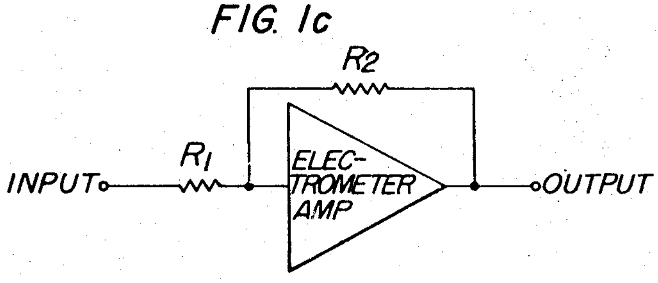
Figure 2A:
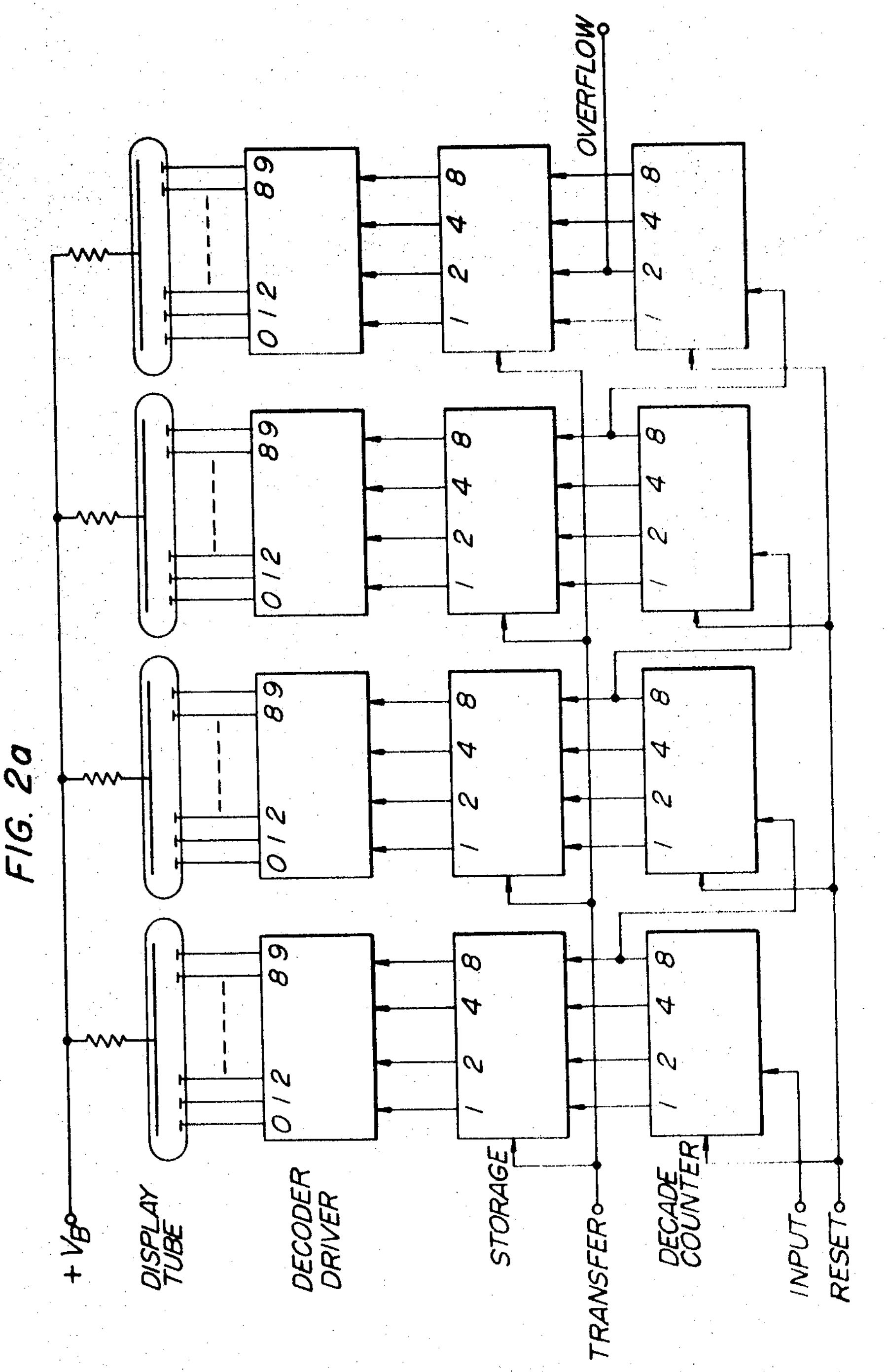
Figure 2B:
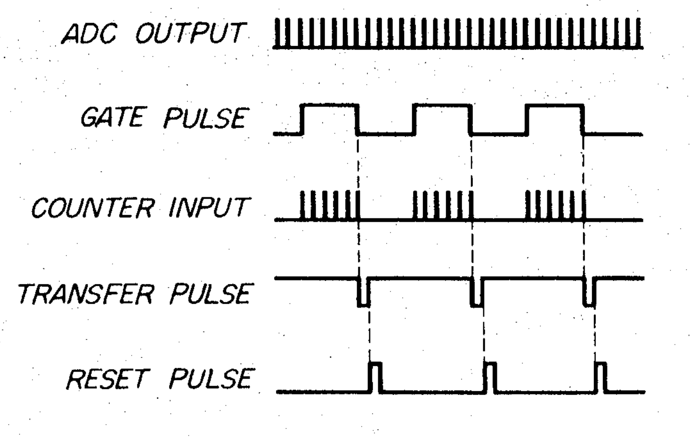
Figure 3B:
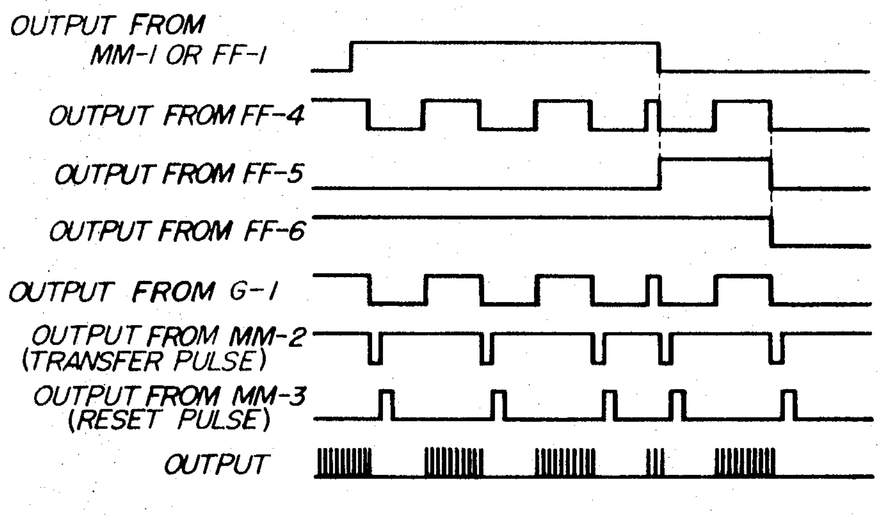
Figure 3A:
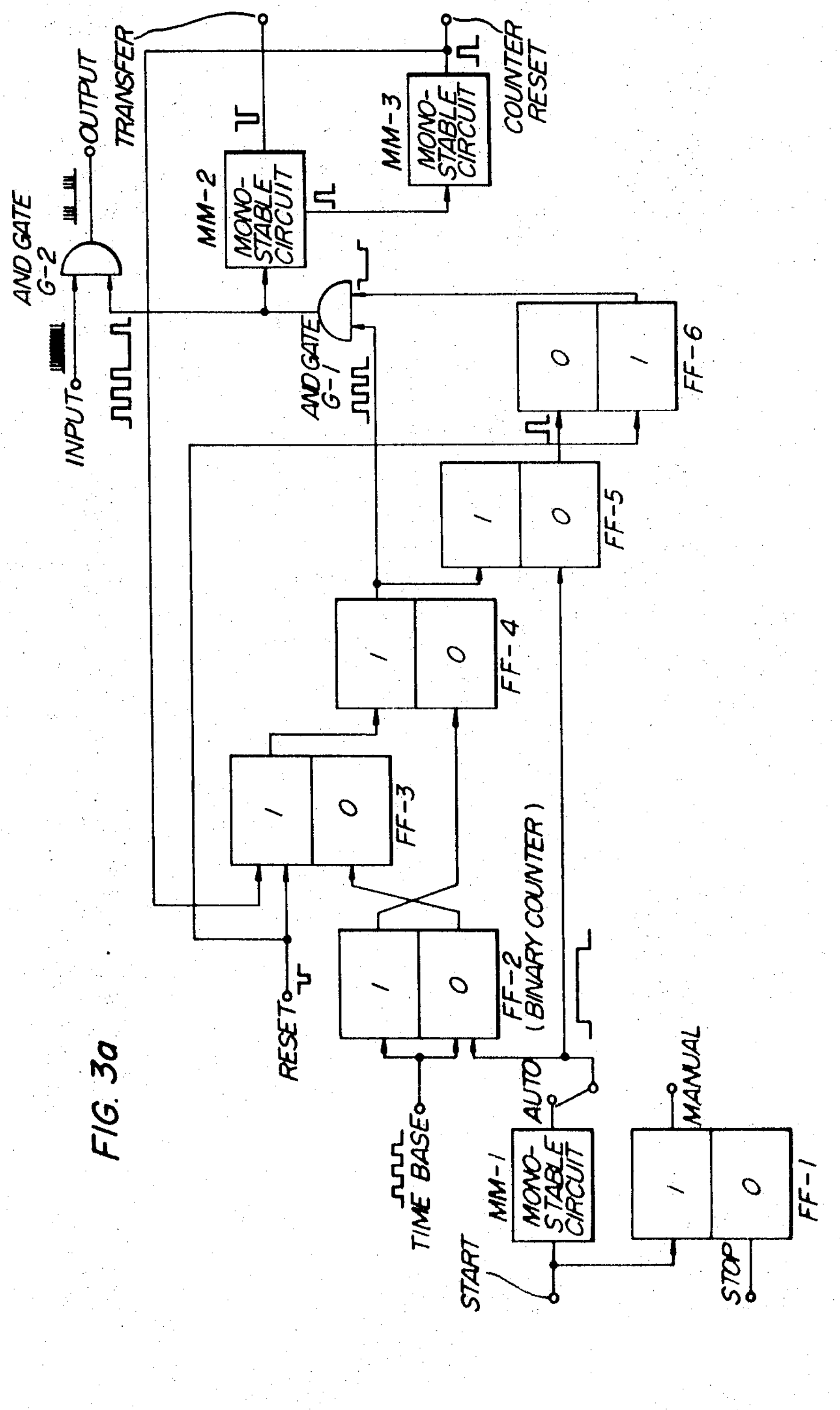
Figure 4A:
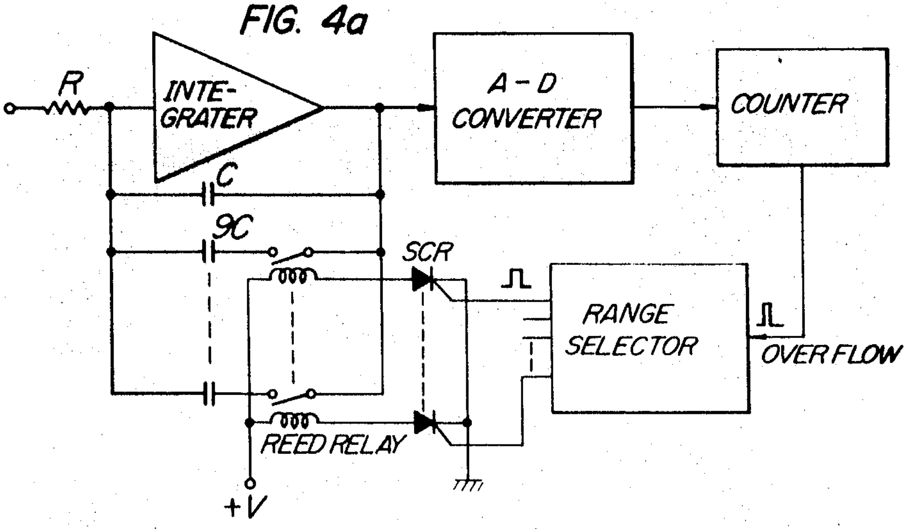
Figure 4B:
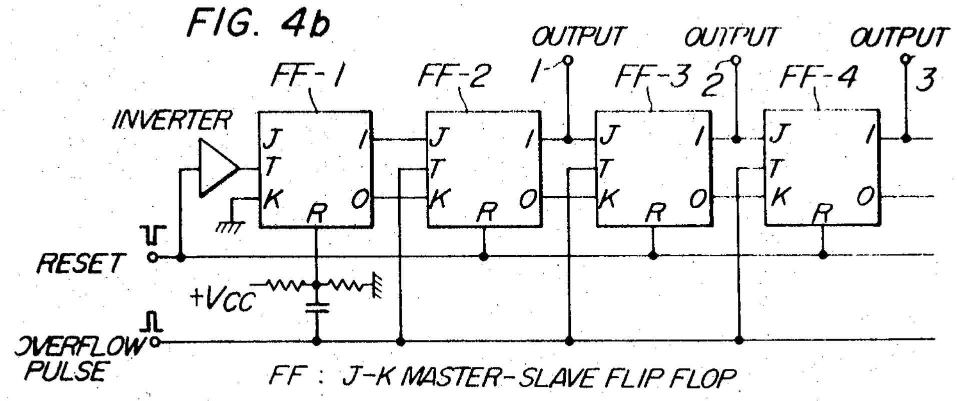
Figure 4C:
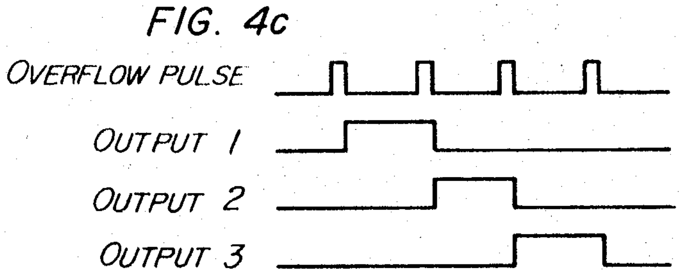
Figure 5:
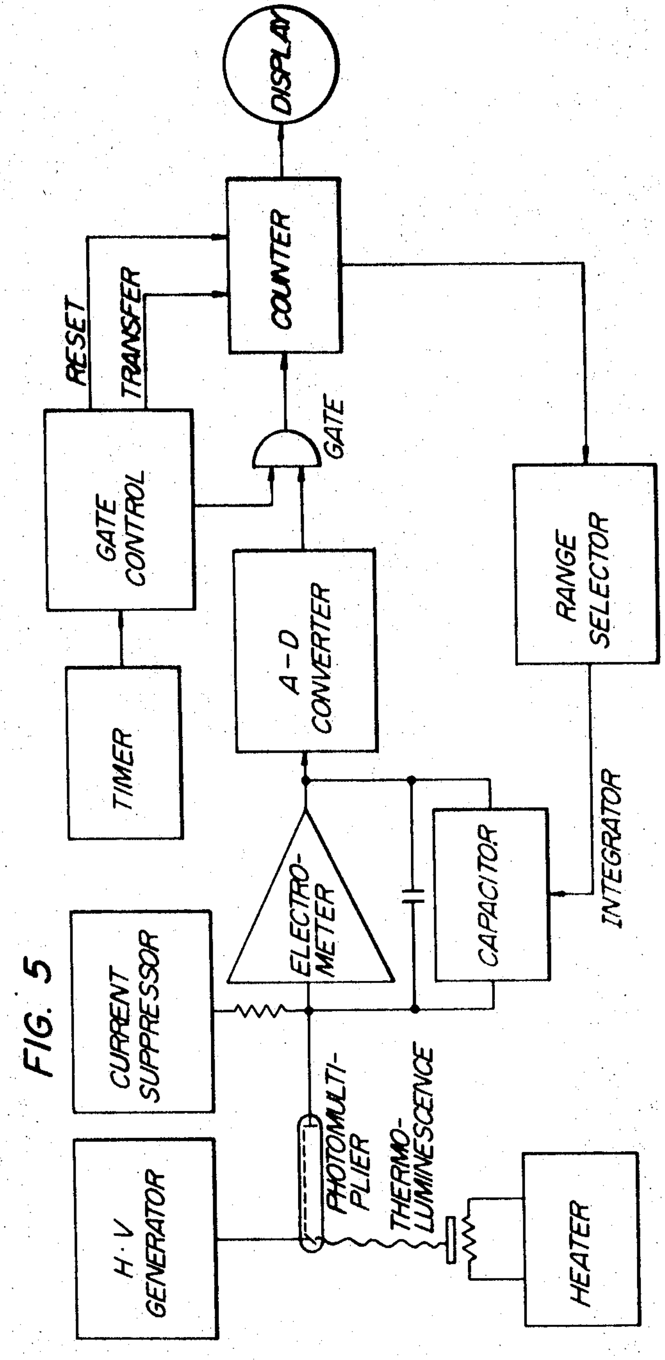

This invention will best be understood from the following detailed description when read in conjunction with the accompanying drawings, in which:

FIGS. 1*a*, 1*b* and 1*c* are block diagrams of the digital electrometer according to the present invention wherein FIG. 1*a* shows an application as a meter for measuring current, FIG. 1*b* an application as a meter for measuring charge, and FIG. 1*c* an application as a meter for measuring voltage;

FIGS. 2*a* and 2*b* are a circuit diagram of a counter and a display in the digital electrometer according to the present invention and a timing chart of the structure shown in FIG. 2*a*, respectively;

FIGS. 3*a* and 3*b* are a circuit diagram of a gate control circuit in the digital electrometer according to the present invention and a timing chart of the structure shown in FIG. 3*a*, respectively;

FIGS. 4*a*, 4*b* and 4*c* are a block diagram of an automatic range switchover circuit in the digital electrometer according to the present invention, a circuit diagram of a range selector in the automatic range switchover circuit, and a timing chart of the range selector, respectively; and FIG. 5 is a block diagram of the thermoluminescence reader according to the present invention.

Referring to FIG. 1, the digital electrometer according to the present invention comprises an electrometer amplifier whose input resistance is more than $10^{12}$ ohms. The electrometer amplifier is associated with a negative feedback circuit including therein a resistor or capacitor as shown so that it acts as an operational amplifier. The electrometer comprises an analog to digital converter (A–D converter) of the integrating type which is called a voltage to frequency converter.

The structure of a counter and a display forming part of the digital electrometer is shown in FIG. 2*a*. The assembly shown in FIG. 2*a* comprises decade counter for counting the number of input pulses subjected to sampling for a predetermined time at a gate, storage circuits for temporarily storing the counted value, decoders for converting the counted value of the BCD code into a decimal equivalent, and drivers for displaying the decimal value. FIG. 2*b* shows a timing chart of the structure shown in FIG. 2*a*. The timing is such that, after the counted value is shifted to the storage circuit by a transfer pulse, a reset pulse resets the decade counter and then the counting of the next cycle is started. Therefore, in order to digitally preserve the counted value at a predetermined time, arrangement may be made so that transfer pulse can not enter the counter after the above-specified time. By this arrangement, the counted value stored temporarily in the storage circuits can be kept displayed on display tubes.

A practical form of a gate control circuit adapted to effect the above manner of control is shown in FIG. 3*a*. A monostable multivibrator MM–1 and a flip-flop circuit FF–1 constitute a timer and are associated with a switching circuit so that one of the auto and manual positions can freely be selected. The measuring time can be determined by the selection of either position. That is, the measuring time is fixed when the monostable multivibrator MM–1 is selected, while the measuring time is freely variable when the flip-flop circuit FF–1 is selected.

As described with reference to FIG. 2, the counter counts the input pulses subjected to sampling by a gate pulse having a fixed period and the reset pulse resets the counter and so on. Since the above operation is independent of the phase of the timer, the timer is not necessarily stopped when the counter is in its reset state, and there is a possibility that the counter may be stopped when it is counting. In such a case, in order to preserve the counted value appearing immediately after the timer is stopped, operation may be such that the counter is reset once and then the counted value obtained by counting in response to arrival of the next gate pulse is preserved. A flip-flop circuit FF–2 is provided in order to detect the relation between the phase of a time base signal and the phase of the output from the timer. In the flip-flop circuit FF–2, the frequency of the time base signal is halved. A flip-flop circuit FF–5 detects the first gate pulse which arrives after the timer is stopped. A flip-flop circuit FF–6 is actuated by the output from the flip-flop circuit FF–5 to close a gate G–1 so that the transfer pulse may not be delivered from that time. Latching flip-flop circuits FF–3 and FF–4 are provided so that the next gate pulse may not be delivered until after the reset pulse for the counter is delivered.

Now, consider the state existing in the gate control circuit before the stop signal generated by the timer MM–1 or FF–1 is applied to the flip-flop circuit FF–2. The output appearing at one of the output terminals of the flip-flop circuit FF–2 triggers the flip-flop circuit FF–4, while the output appearing at the other output terminal of the flip-flop circuit FF–2 triggers the flip-flop circuit FF–3, and the output delivered from the flip-flop circuit FF–3 triggers the flip-flop circuit FF–4. The output from the flip-flop circuit FF–2 is transferred intact to the flip-flop circuit FF–4. That is, the output from the flip-flop circuit FF–2 has exact correspondence to the output from the flip-flop circuit FF–4. The output from the flip-flop circuit FF–4 is applied through the gate G–1 to a gate G–2 and to a monostable multivibrator MM–2 to generate a transfer pulse. That is because the flip-flop circuit FF–5 to which the output from the timer MM–1 or FF–1 is continuously supplied does not undergo a change in its state and the flip-flop circuit FF–6 to which the output from the flip-flop circuit FF–5 is applied does not undergo a change in its state so that the gate G–1 is opened in such a state.

The monostable multivibrator MM–2 is triggered by the output delivered from the flip-flop circuit FF–4 and passed through the gate G–1. The output delivered from the monostable multivibrator MM–2 triggers a monostable multivibrator MM–3 which, therefore, generates a reset pulse for resetting the counter. This reset pulse acts also as a trigger pulse for the flip-flop circuit FF–3. Thus, the output from the flip-flop circuit FF–2 and the output from the monostable multivibrator MM–3 are alternately supplied to the flip-flop circuit FF–3 as a trigger pulse therefor. Accordingly, when the gate G–1 is closed, that is, when the state in the flip-flop circuit FF–6 is varied and no output is delivered therefrom, both the monostable multivibrators MM–2 and MM–3 are not actuated. As a result, the flip-flop circuit FF–3 is not inverted and is kept in its inoperative state even when a trigger pulse is supplied from the flip-flop circuit FF–2. This means that the flip-flop circuit FF–3 plays the role of a latching circuit which is not triggered by the output from the flip-flop circuit FF–2 unless a transfer pulse and a reset pulse appear after one gate pulse has appeared.

Consider next the state in which the stop signal delivered from the timer MM–1 or FF–1 is applied to the flip-flop circuit FF–2 as a trigger signal therefor. If the trigger signal is applied from the timer MM–1 or FF–1 to the flip-flop circuit FF–2 after the trigger pulse is applied from the flip-flop circuit FF–2 to the flip-flop circuit FF–4, the state of the flip-flop circuit FF–2 would be inverted by the trigger signal coming from the timer MM–1 or FF–1 before the next trigger pulse is applied from the time base signal supply to the flip-flop circuit FF–2. As a result, the state of the flip-flop circuit FF–4 is forcedly inverted and the regularity of the output from the flip-flop circuit FF–4 is deranged at such a time as shown in FIG. 3*b*.

On the other hand, the stop signal is applied also to the flip-flop circuit FF–5 from the timer MM–1 or FF–1 which is stopped. As a result, the state of the flip-flop circuit FF–5 is inverted and is then restored to the previous state in response to subsequent arrival of the first output from the flip-flop circuit FF–4. As the flip-flop circuit FF–5 is restored, the output delivered from the flip-flop circuit FF–5 triggers the flip-flop circuit FF–6. Inverted output from the flip-flop circuit FF–6 closes the gate G–1 so that the passage of the output from the flip-flop circuit FF–4 through the gate G–1 is blocked. The monostable multivibrator MM–2 stops its operation immediately and no transfer pulse is delivered therefrom so that the previous counted value stored in the storage circuit in the counter is preserved in the existing form. Needless to say, the gate G–2 is also closed.

Thus, it will be understood that the timer is set to give a predetermined measuring time and the measured value taken immediately after the stoppage of the timer is digitally preserved in the counter for subsequent display. Therefore, it is possible to observe a phenomenon which appears only once.

The next description will be directed to a method of automatically switching over the range in the case in which the digital electrometer is used as a current integrator. Suppose that overflow takes place when a certain predetermined value appears at the most significant digit of the counter in FIG. 2*a*, or when, for example, the counted value in a four-digit display exceeds 1999. Then, the range may be switched over each time the overflow pulse appears. Therefore, the range selection circuit must be such that successive overflow pulses appearing at different times can be derived from separate terminals spaced apart from each other. FIG. 4*a* shows a practical form of such a circuit. FIG. 4*b* shows a modification of the shift register. In FIG. 4*b*, all the flip-flop circuits FF–1 through FF–N are of the J–K master-slave system. At first, the flip-flop circuit FF–1 is set in a state (1, 0) by a reset pulse. The state (1, 0) is shifted successively through the flip-flop circuits each time the overflow pulse enters the range selector. Output terminals 1, 2, 3, ..... N of the flip-flop circuits are connected with gates of corresponding silicon-controlled rectifiers SCR shown in FIG. 4*a*. The silicon-controlled rectifiers SCR are successively turned on and remain in their on state in spite of the fact that the pulse disappears and another pulse is applied to the next terminal. Relays are energized and current flows through successive capacitors arranged in parallel with each other in the circuit. Suppose that these capacitors have respective capacities of 9C, 90C, 900C, ..... which are 9, 90, 900, .... times the initial value C. Then, the range is switched over at a rate of 20 dB. The relays employed herein are read relays having a high insulation resistance. A conventional shift register may be employed in the range selector. In this case, the information (1,0) shifts from stage to stage each time the overflow pulse is applied, and therefore, transistors may be employed in lieu of the silicon-controlled rectifiers. Thus, the overflow from the counter can be utilized for the automatic switchover of the range because the integrated value increases continuously unless a change occurs in the polarity of current input to the current integrator.

The digital current integrator described hereinabove may be combined with a photomultiplier and a heater to constitute a thermoluminescence reader as shown in FIG. 5. Thermoluminescence occurs when a thermoluminescent dosimeter (TLD) irradiated with radiation is heated up to about 400° C. The thermoluminescence is converted into a current by the photomultiplier and the current is integrated to detect the dose of directed radiation. A timer in the reader may be set to give a predetermined integrating time since the thermoluminescence will be exhausted in about 10 seconds. In this manner, it is possible to automatically preserve the measured value taken immediately after the integration is completed and to automatically effect the switchover of the range.

What is claimed is:

1. A digital electrometer comprising an electrometer amplifier for amplifying an analog input, an analog to digital converter for converting the output from said amplifier into a digital quantity, a gate circuit for sampling the output from said converter, counter means for counting the output from said gate circuit, a timer for setting the measuring time, and a gate control circuit for detecting the relation between the phase of the output from said timer and the phase of a gate pulse controlling the opening and closure of said gate circuit, said gate control circuit detecting a pulse arriving first at said gate circuit immediately after said timer is stopped so as to preserve the value counted by said counter means.

2. A digital electrometer according to claim 1, in which said gate control circuit comprises a timer, a first bistable circuit for detecting the relation between the phase of the output from the timer and the phase of a signal from a timer base signal supply, a second bistable circuit driven by a gate pulse arriving first after said timer is stopped, a third bistable circuit for detecting a variation occuring in the output from said second bistable circuit in response to arrival of said gate pulse thereby stopping the operation of a transfer pulse generator, and a reset pulse generator for generating a pulse for resetting said counter means after said transfer pulse generator generates the transfer pulse.

3. A digital electrometer according to claim 1, in which said counter means comprises a decade counter for counting the output from said gate circuit, a storage circuit for temporarily storing the value counted by said counter, a decoder for converting the counted value into a decimal value, and a driver for supplying the decoder output to a display tube.

4. A digital electrometer according to claim 3, in which a plurality of cascade connections each consisting of said decade counter, said storage circuit, said decoder and said driver are connected in parallel with each other in such a relation that the output from the most significant digit of one of the decade counters is connected to the input of the decade counter disposed in the next stage and an overflow pulse is derived from the decade counter disposed in the last stage.

5. A digital electrometer according to claim 1, in which said electrometer amplifier is provided with a feedback circuit including a capacitive impedance.

6. A digital electrometer according to claim 5, in which said feedback circuit comprises a plurality of parallelly disposed capacitors which are connected, with the exception of at least one of them, to a range selector through respective-switching means in series relation therewith so that the overflow pulse supplied from said counter means acts to successively turn on said switching means.

7. A digital electrometer according to claim 6, in which said range selector is in the form of a shift register.

8. A digital electrometer according to claim 6, in which a photomultiplier is connected to the input terminal of said electrometer amplifier which detects thermoluminescence emitted from a thermoluminescent dosimeter when the latter is heated, and the output from the photomultiplier is integrated for a predetermined time to detect the dose.

9. A digital electrometer according to claim 1, in which said electrometer amplifier is provided with a feedback circuit including therein a resistive impedance.

UNITED STATES PATENT OFFICE
CERTIFICATE OF CORRECTION

Patent No. 3,614,436 Dated October 19, 1971

Inventor(s) Seiro HASEGAWA et al

It is certified that error appears in the above-identified patent and that said Letters Patent are hereby corrected as shown below:

In the Claim for Priority, the first of the two Japanese patent applications should read --43/71-- instead of 42/71.

Signed and sealed this 18th day of April 1972.

(SEAL)
Attest:

EDWARD M. FLETCHER, JR.
Attesting Officer

ROBERT GOTTSCHALK
Commissioner of Patents

)RM PO-1050 (10-69)
USCOMM-DC 60376-P69
☆ U.S. GOVERNMENT PRINTING OFFICE 1969 O—366-334